US009718658B1

(12) United States Patent
Winston

(10) Patent No.: US 9,718,658 B1
(45) Date of Patent: Aug. 1, 2017

(54) VEHICLE TROLLEY DEVICE

(71) Applicant: Jerry Winston, Mesa, AZ (US)

(72) Inventor: Jerry Winston, Mesa, AZ (US)

( * ) Notice: Subject to any disclaimer, the term of this patent is extended or adjusted under 35 U.S.C. 154(b) by 6 days.

(21) Appl. No.: 14/997,655

(22) Filed: Jan. 18, 2016

(51) Int. Cl.
*B60B 29/00* (2006.01)
*B66F 7/24* (2006.01)

(52) U.S. Cl.
CPC .................................... *B66F 7/246* (2013.01)

(58) Field of Classification Search
USPC .................................................. 414/430, 537
See application file for complete search history.

(56) References Cited

U.S. PATENT DOCUMENTS

| | | | | |
|---|---|---|---|---|
| 863,122 A | | 8/1907 | Weber | |
| 2,259,399 A | | 10/1941 | Sutter | |
| 2,350,118 A | | 5/1944 | Knapp | |
| 2,552,804 A | | 5/1951 | Morris | |
| 2,610,750 A | | 9/1952 | Hulbert | |
| 4,121,788 A | * | 10/1978 | McMahon | B64F 1/22 180/198 |
| 4,350,470 A | | 9/1982 | Murillo | |
| 5,039,123 A | | 8/1991 | Smeitink | |
| 5,249,907 A | | 10/1993 | Poten et al. | |
| D442,755 S | | 5/2001 | Fluss | |
| 2002/0192061 A1 | * | 12/2002 | Brehmer | B66F 7/243 414/430 |
| 2007/0166137 A1 | * | 7/2007 | Toal | B66F 7/246 414/430 |

* cited by examiner

*Primary Examiner* — Saul Rodriguez
*Assistant Examiner* — Willie Berry, Jr.

(57) ABSTRACT

A vehicle trolley device for mobilizing a vehicle with a flattened tire includes a ramp that comprises a field that is coupled to and extends between a pair of side supports. A plurality of wheels is coupled to a lower face of the ramp. The plurality of wheels is positioned proximate to a top end of the ramp. A plurality of fasteners is configurable to secure the ramp to the bottom of a flattened tire of a vehicle. The plurality of wheels is positioned on the ramp such that the ramp is configured for the user to position a vehicle that has a flattened tire onto the ramp. The ramp then is not in contact with the ground. The plurality of fasteners is configured to secure the flattened tire to the ramp, such that the user can drive the vehicle.

17 Claims, 5 Drawing Sheets

VEHICLE TROLLEY DEVICE

BACKGROUND OF THE DISCLOSURE

Field of the Disclosure

The disclosure relates to trolley devices and more particularly pertains to a new trolley device for mobilizing a vehicle with a flattened tire.

SUMMARY OF THE DISCLOSURE

An embodiment of the disclosure meets the needs presented above by generally comprising a ramp that comprises a field that is coupled to and extends between a pair of side supports. A plurality of wheels is coupled to a lower face of the ramp. The plurality of wheels is positioned proximate to a top end of the ramp. A plurality of fasteners is configurable to secure the ramp to the bottom of a flattened tire of a vehicle. The plurality of wheels is positioned on the ramp such that the ramp is configured for the user to position a vehicle that has a flattened tire onto the ramp. The ramp then is not in contact with the ground. The plurality of fasteners is configured to secure the flattened tire to the ramp, such that the user can drive the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
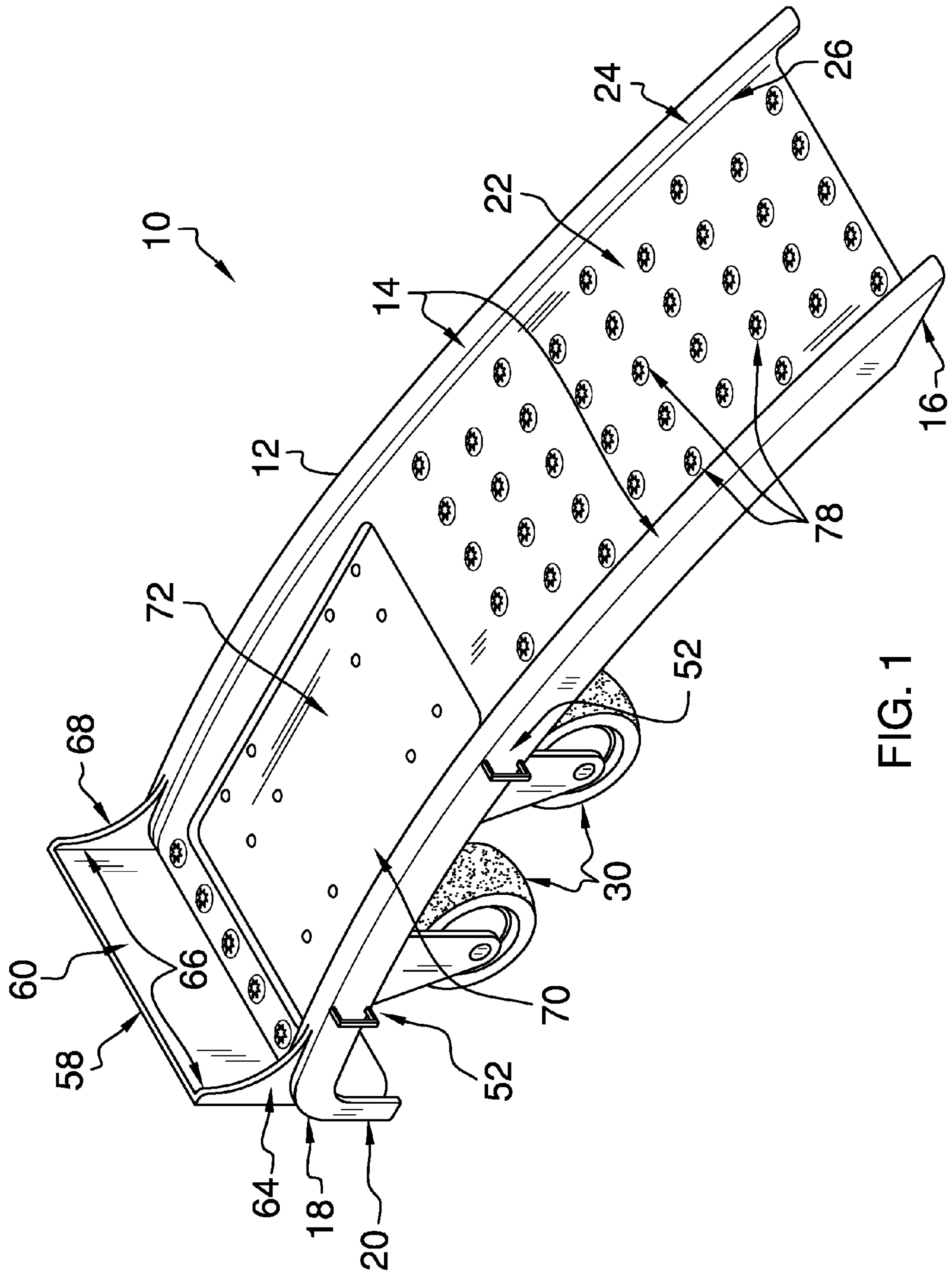
FIG. 1 is an isometric perspective view of a vehicle trolley device according to an embodiment of the disclosure.
Figure 2:
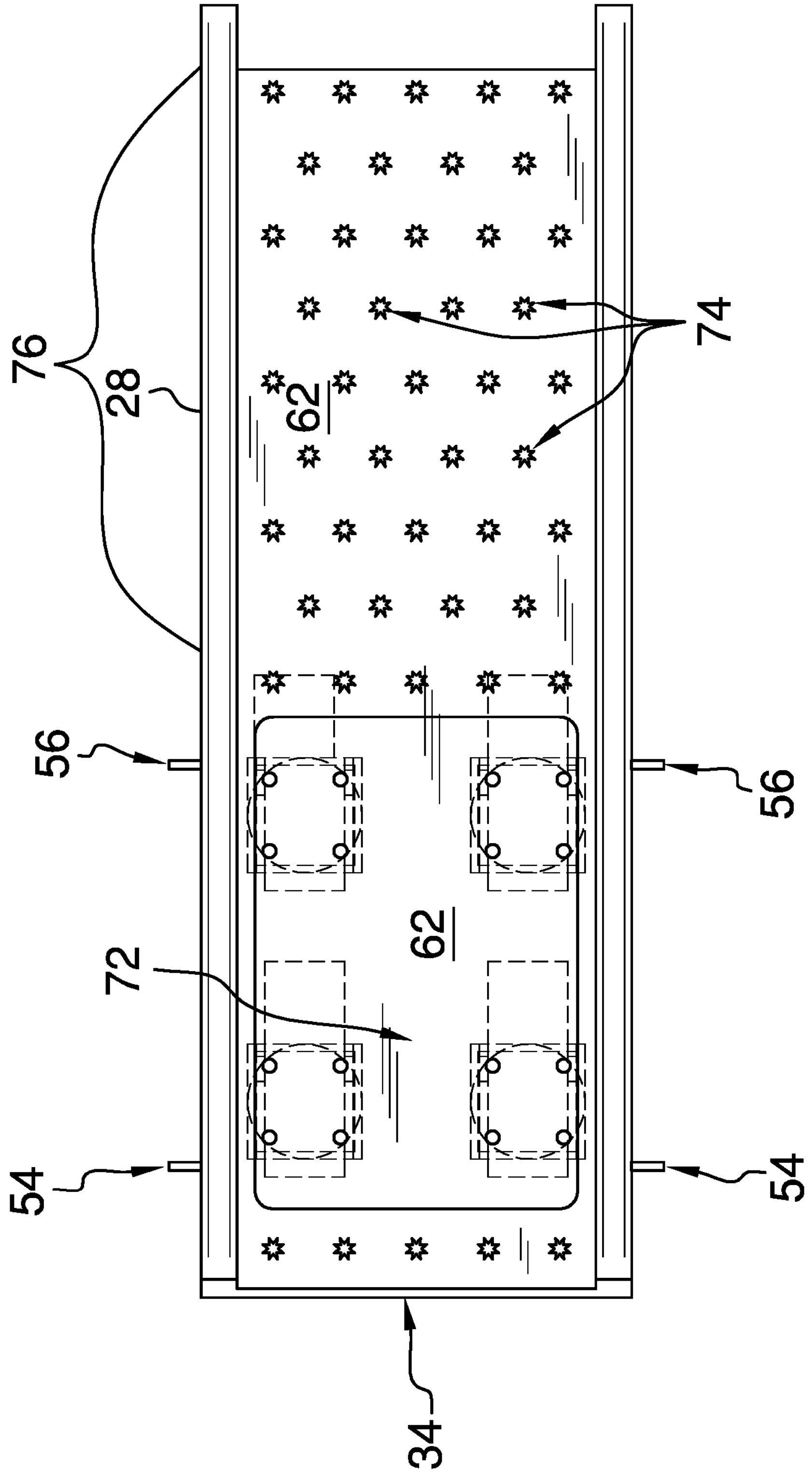
FIG. 2 is a top view of an embodiment of the disclosure.
Figure 3:
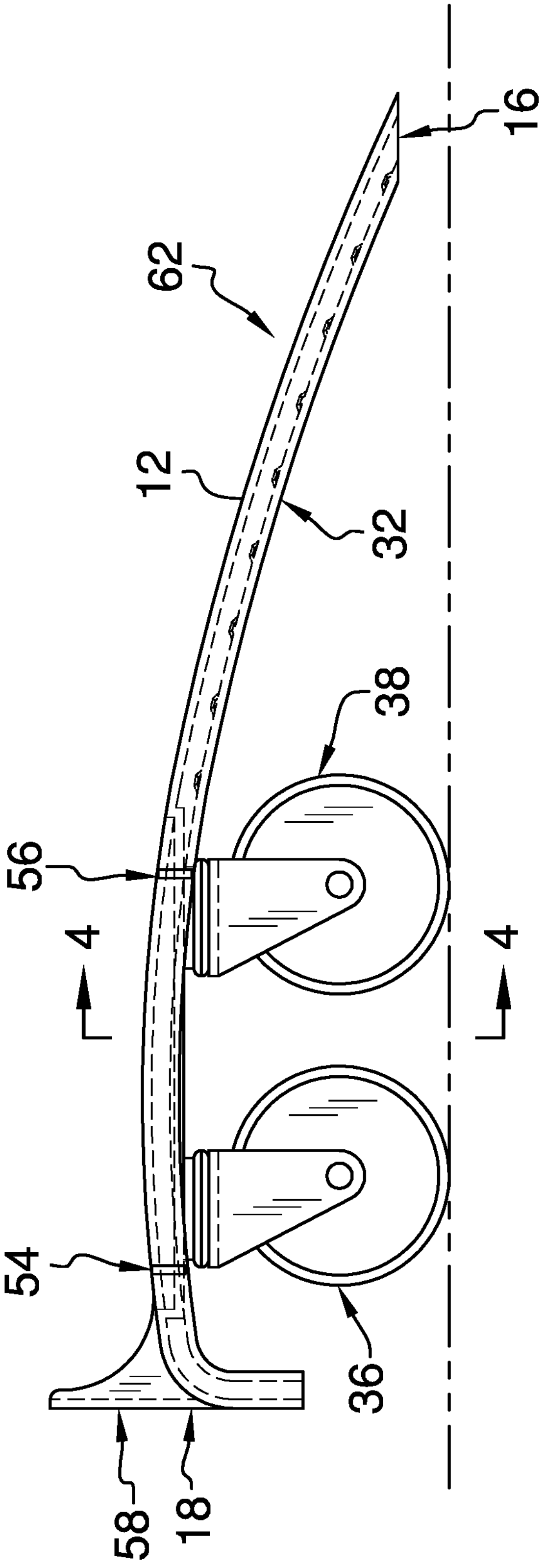
FIG. 3 is a side view of an embodiment of the disclosure.
Figure 4:
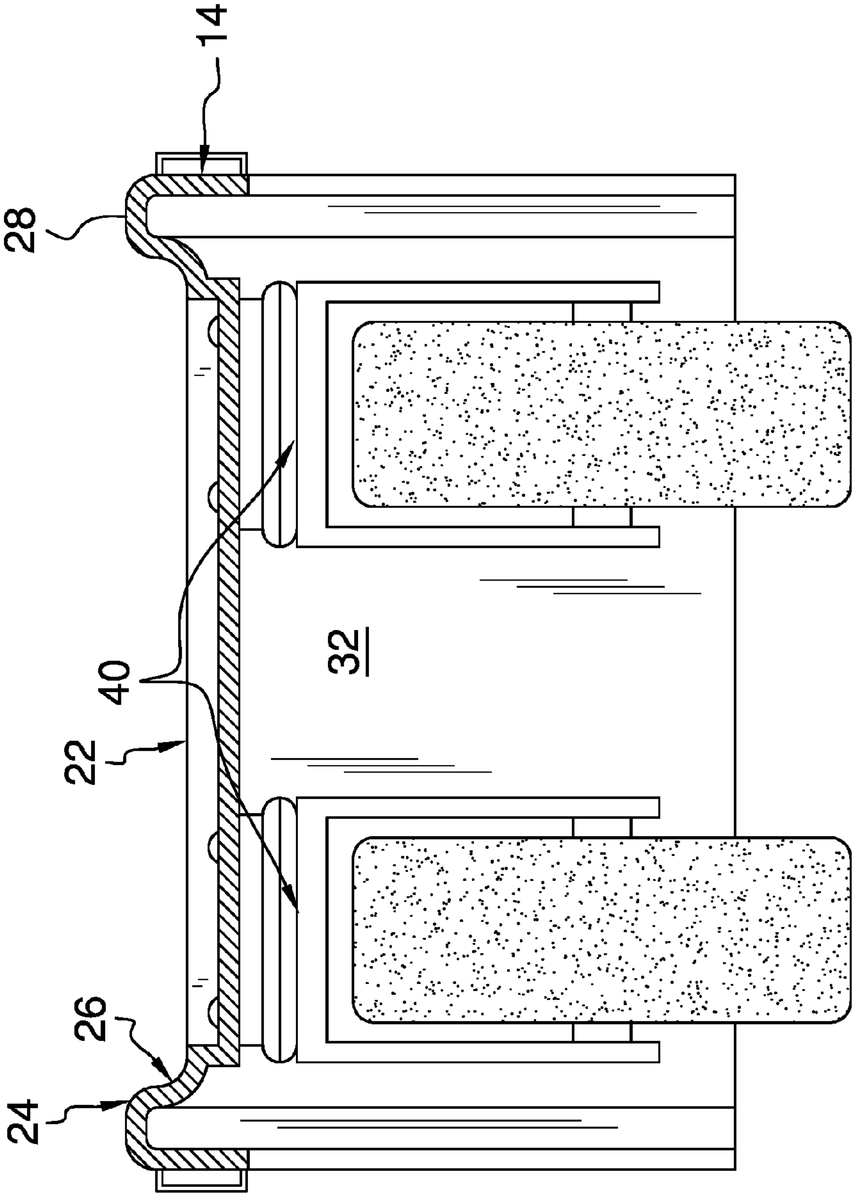
FIG. 4 is a cut-away view of an embodiment of the disclosure.
Figure 5:
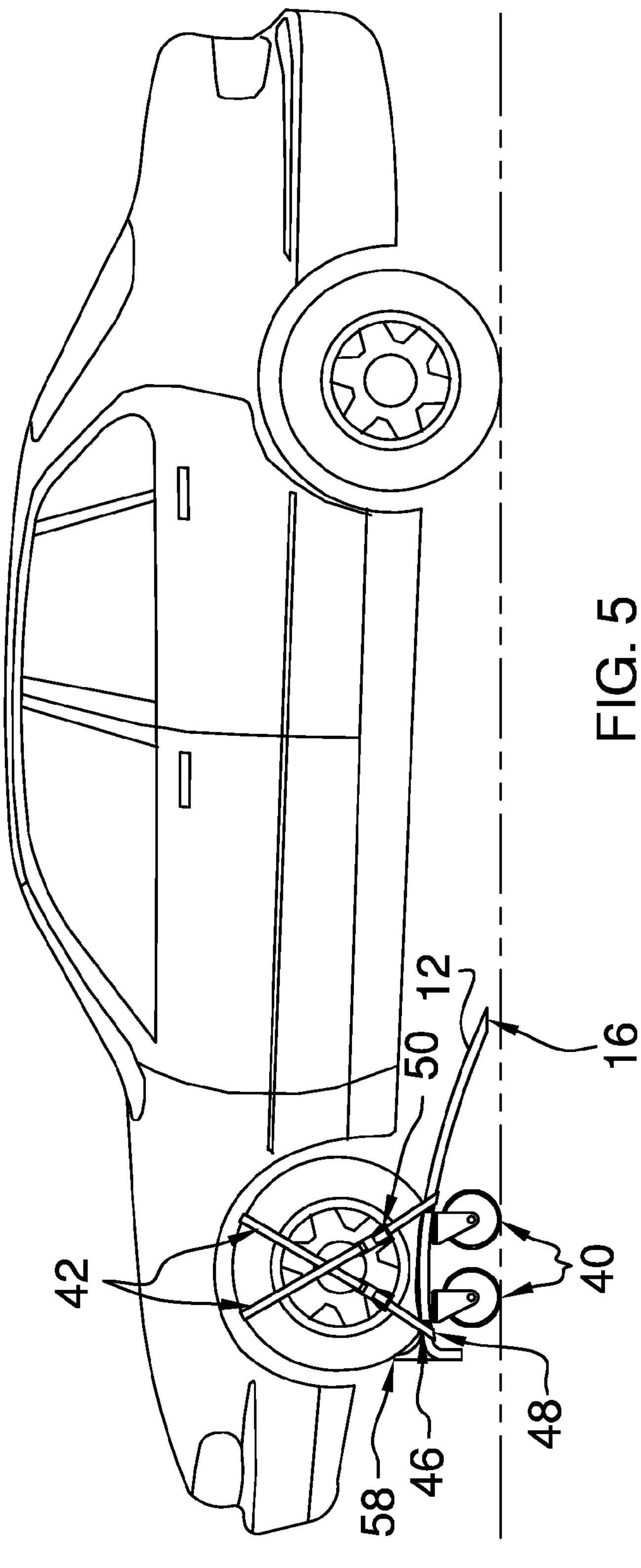
FIG. 5 is an in-use view of an embodiment of the disclosure.

With reference now to the drawings, and in particular to FIGS. 1 through 5 thereof, a new trolley device embodying the principles and concepts of an embodiment of the disclosure and generally designated by the reference numeral 10 will be described.

As best illustrated in FIGS. 1 through 5, the vehicle trolley device 10 generally comprises a ramp 12 that comprises a pair of side supports 14. The side supports 14 are substantially rectangular when viewed longitudinally. The side supports 14 are arcuate. Each side support 14 has a tapered end 16 and a stop end 18. The stop end 18 comprises an extension 20 that is coupled to and extends transversely from the side support 14. The tapered end 16 is configured to engage the ground such that the ramp 12 is supported when a vehicle that has a flattened tire is positioned onto the ramp 12. A field 22 is coupled to and extends between the side supports 14. Preferably, the field 22 is coupled to each side support 14 proximate to a respective top rim 24 of the side support 14, such that the field 22 and each side support 14 define an outer ridge 26. Preferably, the ramp 12 is formed from a single molded unit 28.

A plurality of wheels 30 is coupled to a lower face 32 of the ramp 12. The plurality of wheels 30 is positioned proximate to a top end 34 of the ramp 12. Preferably, the plurality of wheels 30 is rotationally coupled to the lower face 32 of the ramp 12, such that the wheels 30 turn when the user changes the direction of a moving vehicle secured to the ramp 12. The plurality of wheels 30 may comprise a pair of front wheels 36 and a pair of rear wheels 38. The wheels 30 may be rectangularly arrayed proximate to the top end 34 of the ramp 12. Preferably, the plurality of wheels 30 comprises castor wheels 40.

A plurality of fasteners 42 is configurable to secure the ramp 12 to the bottom of a flattened tire of a vehicle. Each fastener 42 comprises a strap 44 that has opposing termini 46. Each of a pair of hooks 48 is coupled to a respective one of the opposing termini 46. A ratchet 50 is coupled to the strap 44 between the opposing termini 46, such that the ratchet 50 is positioned on the strap 44 and operable to shorten the strap 44. Each of a plurality of couplers 52 is coupled to a respective side support 14 of the ramp 12. Each coupler 52 is positioned proximate to the top end 34. The couplers 52 are complimentary to the hooks 48, such that each coupler 52 is positioned to couple with a respective hook 48 to secure a respective fastener 42 positioned around a flattened tire to the ramp 12. The plurality of couplers 52 may comprise a pair of front eyelets 54 and a pair of rear eyelets 56. Each front eyelet 54 is coupled proximate to a respective front wheel 36, and each rear eyelet 56 is coupled proximate to a respective rear wheel 38.

A stop 58 is coupled to the top end 34 of the ramp 12, such that the stop 58 is configured to prevent a wheel from rolling over the top end 34 of the ramp 12. The stop 58 comprises a plate 60 that is coupled to and extends upwardly from an upper face 62 of the ramp 12. Preferably, the plate 60 is substantially perpendicular to the field 22. The plate 60 also may extend downwardly from the lower face 32 of the ramp 12 and be coupled to and extend between the extensions 20 of the side supports 14. Each of a pair of side braces 64 is coupled to a respective opposing end 66 of the plate 60 and a respective side support 14. Each side brace 64 has an edge 68 that is arcuate.

A tire rest 70 is positioned proximate to the top end 34 of the ramp 12. The tire rest 70 comprises a depression 72 positioned over the plurality of wheels 30. The tire rest 70 is configured to engage the bottom of a flattened tire to motivate the flattened tire to maintain a set position on the ramp 12. Preferably, the depression 72 is substantially rectangular.

A plurality of grips 74 is coupled to and positioned in a lower section 76 of the ramp 12. The grips 74 are configured to engage a tire rotating on the ramp 12 to provide traction. Preferably, the plurality of grips 74 comprises perforations 78 through the lower face 32 of the ramp 12, such that the perforations 78 extend upwardly from the upper face 62 of the ramp 12. Also preferably, the perforations 78 are linearly arrayed.

In use, the ramp 12 is configured for the user to position a vehicle that has a flattened tire onto the ramp 12. The plurality of grips 74 is positioned to provide traction to the flattened tire as it is moved up the ramp 12. The stop 58 is positioned to prevent the tire from rolling off the ramp 12. With the vehicle now positioned with the flattened tire in the tire rest 70 of the ramp 12, the tapered ends 16 of the side supports 14 are positioned off of the ground. The plurality of fasteners 42 is configured to secure the flattened tire to the ramp 12 by coupling the hooks 48 to the couplers 52 and using the ratchet 50 to tighten the straps 44. The plurality of wheels 30 is positioned on the ramp 12 such that the user can drive the vehicle despite the flattened tire.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle trolley device comprising:

a ramp; said ramp comprising a field coupled to and extending between a pair of side supports, said ramp comprising said side supports being substantially rectangular when viewed longitudinally, each said side support having a tapered end and a stop end, said stop end comprising an extension, said extension being coupled to and extending transversely from said side support, said tapered end being configured to engage the ground such that said ramp is supported when a vehicle having a flattened tire is positioned onto said ramp, and said field being coupled to each said side support proximate to a respective top rim of said side support defining an outer ridge;

a plurality of wheels, said plurality of wheels being coupled to a lower face of said ramp, said plurality of wheels being positioned proximate to a top end of said ramp;

a plurality of fasteners; said fasteners being configurable to secure said ramp to the bottom of a flattened tire of a vehicle;

wherein said plurality of wheels are positioned on said ramp such that said ramp is configured for the user to position a vehicle having a flattened tire onto said ramp, wherein said ramp then is not in contact with the ground and wherein said plurality of fasteners are configured to secure the flattened tire to said ramp, such that the user can drive the vehicle; and a stop, said stop being coupled to said top end of said ramp, wherein said stop is configured to prevent a wheel from rolling over said top end of said ramp, said stop comprising a plate, said plate being coupled to and extending upwardly from said upper face of said ramp, said plate being substantially perpendicular to said field, and a pair of side braces, each said side brace being coupled to a respective opposing end of said plate and a respective said side support, each said side brace having an edge, said edge being arcuate.

2. The device of claim 1, further including said side supports being arcuate.

3. The device of claim 1, further including said ramp being formed from a single molded unit.

4. The device of claim 1, further including said plurality of wheels comprising a pair of front wheels and a pair of rear wheels.

5. The device of claim 4, further including said wheels being rectangularly arrayed proximate to said top end of said ramp.

6. The device of claim 1, further including said plurality of wheels being rotationally coupled to said lower face of said ramp, wherein said wheels turn when the user changes the direction of a moving vehicle secured to said ramp.

7. The device of claim 1, further including said plurality of wheels comprising castor wheels.

8. The device of claim 1, further including each said fastener comprising:

a strap, said strap having opposing termini;

a pair of hooks, each said hook being coupled to a respective one of said opposing termini;

a ratchet, said ratchet being coupled to said strap between said opposing termini; and wherein said ratchet is positioned on said strap and operable to shorten said strap.

9. The device of claim 8, further including a plurality of couplers, each said coupler being coupled to a respective said side support of said ramp, each said coupler being positioned proximate to said top end, said couplers being complimentary to said hooks, wherein each said coupler is positioned to couple with a respective said hook to secure a respective said fastener positioned around a flattened tire to said ramp.

10. The device of claim 9, further including said plurality of couplers comprising a pair of front eyelets and a pair of rear eyelets, each said front eyelet being coupled proximate to a respective said front wheel, each said rear eyelet being coupled proximate to a respective said rear wheel.

11. The device of claim 1, further including said plate extending downwardly from said lower face of said ramp, said plate being coupled to and extending between said extensions of said side supports.

12. The device of claim 1, further including a tire rest, said tire rest being positioned proximate to said top end of said ramp, said tire rest comprising a depression positioned over said plurality of wheels, wherein said tire rest is configured to engage the bottom of a flattened tire to motivate the flattened tire to maintain a set position on said ramp.

13. The device of claim 12, further including said depression being substantially rectangular.

14. The device of claim 1, further including a plurality of grips, said plurality of grips being coupled to and positioned in a lower section of said ramp, such that said grips are configured to engage a tire rotating on said ramp to provide traction.

15. The device of claim 14, further including said plurality of grips comprising perforations through said lower face of said ramp, such that said perforations extend upwardly from an upper face of said ramp.

16. The device of claim 15, further including said perforations being linearly arrayed.

17. A vehicle trolley device comprising:

a ramp, said ramp comprising:

a pair of side supports, said side supports being substantially rectangular when viewed longitudinally, said side supports being arcuate, each said side support having a tapered end and a stop end, said stop end comprising an extension, said extension being coupled to and extending transversely from said side support, said tapered end being configured to engage the ground such that said ramp is supported when a vehicle having a flattened tire is positioned onto said ramp, a field coupled to and extending between said side supports, and said field being coupled to each said side support proximate to a respective top rim of said side support, such that said field and each said side support define an outer ridge;

said ramp being formed from a single molded unit;

a plurality of wheels, said plurality of wheels being coupled to a lower face of said ramp, said plurality of wheels being positioned proximate to a top end of said ramp;

said plurality of wheels being rotationally coupled to said lower face of said ramp, wherein said wheels turn when the user changes the direction of a moving vehicle secured to said ramp;

said plurality of wheels comprising a pair of front wheels and a pair of rear wheels;

said wheels being rectangularly arrayed proximate to said top end of said ramp;

said plurality of wheels comprising castor wheels;

a plurality of fasteners; said fasteners being configurable to secure said ramp to the bottom of a flattened tire of a vehicle;

each said fastener comprising:

a strap, said strap having opposing termini, a pair of hooks, each said hook being coupled to a respective one of said opposing termini, a ratchet, said ratchet being coupled to said strap between said opposing termini, and wherein said ratchet is positioned on said strap and operable to shorten said strap;

a plurality of couplers, each said coupler being coupled to a respective said side support of said ramp, each said coupler being positioned proximate to said top end, said couplers being complimentary to said hooks, wherein each said coupler is positioned to couple with a respective said hook to secure a respective said fastener positioned around a flattened tire to said ramp;

said plurality of couplers comprising a pair of front eyelets and a pair of rear eyelets, each said front eyelet being coupled proximate to a respective said front wheel, each said rear eyelet being coupled proximate to a respective said rear wheel;

a stop, said stop being coupled to said top end of said ramp, wherein said stop is configured to prevent a wheel from rolling over said top end of said ramp;

said stop comprising:

a plate, said plate being coupled to and extending upwardly from said upper face of said ramp, said plate being substantially perpendicular to said field, said plate extending downwardly from said lower face of said ramp, said plate being coupled to and extending between said extensions of said side supports, a pair of side braces, each said side brace being coupled to a respective opposing end of said plate and a respective said side support, and each said side brace having an edge, said edge being arcuate;

a tire rest, said tire rest being positioned proximate to said top end of said ramp, said tire rest comprising a depression positioned over said plurality of wheels, wherein said tire rest is configured to engage the bottom of a flattened tire to motivate the flattened tire to maintain a set position on said ramp;

said depression being substantially rectangular;

a plurality of grips, said plurality of grips being coupled to and positioned in a lower section of said ramp, such that said grips are configured to engage a tire rotating on said ramp to provide traction;

said plurality of grips comprising perforations through a lower face of said ramp, such that said perforations extend upwardly from said upper face of said ramp;

said perforations being linearly arrayed; and wherein said plurality of wheels are positioned on said ramp such that said ramp is configured for the user to position a vehicle having a flattened tire onto said ramp, wherein said ramp then is not in contact with the ground and wherein said plurality of fasteners are configured to secure the flattened tire to said ramp, such that the user can drive the vehicle.

* * * * *